July 28, 1936.  H. F. RITTER  2,048,969
COILABLE METAL TAPE
Filed Sept. 25, 1934
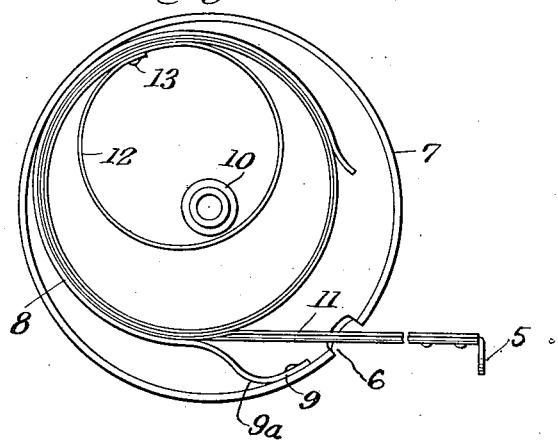
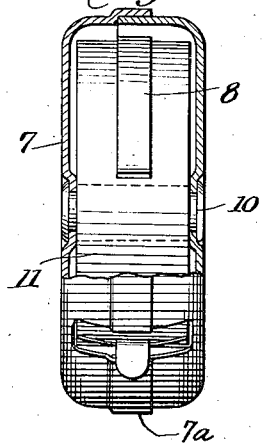
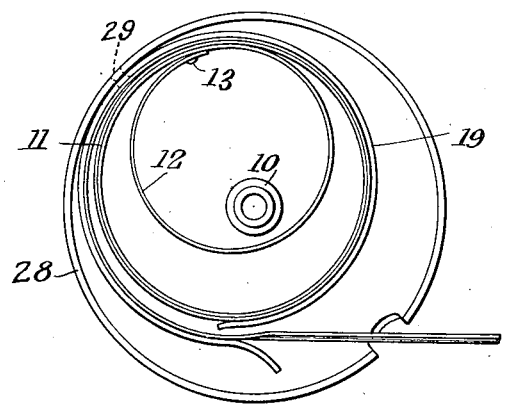
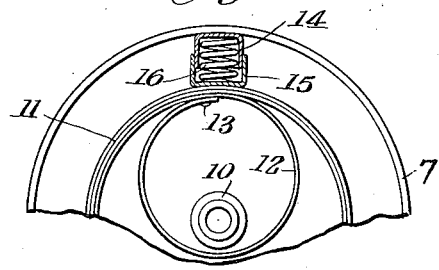
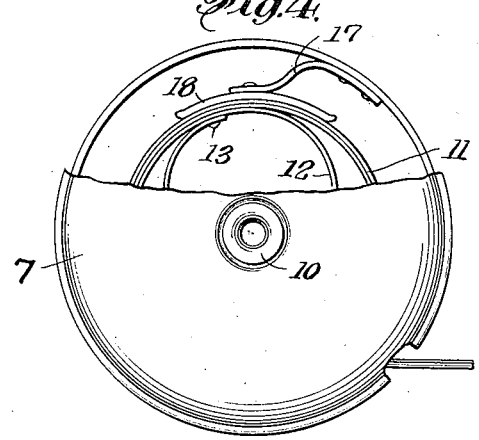
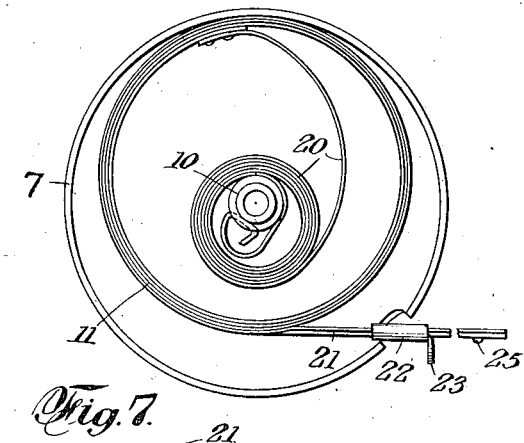
INVENTOR
*Herbert F. Ritter*
BY
*C. James Cottrell*
ATTORNEY Patented July 28, 1936

2,048,969

UNITED STATES PATENT OFFICE 2,048,969

COILABLE METAL TAPE

Herbert F. Ritter, Bogota, N. J.

Application September 25, 1934, Serial No. 745,384

1 Claim. (Cl. 33—138)

This invention relates to coilable metal measuring tapes; and more particularly to coilable measuring devices employing a coilable metal tape of the concavo-convex type or other suitable non-planar forms, and being of suitable length, thickness and curvature to be stiff and straight when extended. Tapes of the type herein considered are commonly made in lengths from three feet to ten feet; and are enclosed when coiled in a suitable casing.

Heretofore, such coilable metal measuring tapes have been attached to coiled springs fixed to the casing. In some forms, the spring is strong enough to completely wind the tape in the casing unaided; and in another form, that is the "push-pull" type, the coiled spring is of insufficient strength to wind the tape unaided, and it is necessary to push the tape back into the casing. The "push-pull" type of coilable metal measuring tape has been found advantageous in that when the tape is drawn out of the casing to a desired length, it will not creep or slip and will stay positively wherever it is put, without resort to ratchets, or other forms of detents as is the case with strong springs. However, forms of coilable measuring tapes employing winding springs, whether of the "push-pull" type or not are objectionable in that winding springs of considerable length must be used, which considerably increases the cost of manufacture of the devices, as the cost of the winding springs is greater than the cost of the concavo-convex tape itself.

It is, therefore, an object of this invention to provide a coilable measuring tape of the concavo-convex type in which no winding spring is used, thus materially decreasing the cost of manufacture, at the same time providing a measuring tape of the "push-pull" type which will stay at whatever length it may be drawn without undesirable creeping or shifting.

A further object of my invention is to provide a slider movable along the tape on the outside of the casing to positively hold a tape in any desired position and to serve as a marker during measuring operations. The slider is especially adapted for use with tapes having winding springs whether of the complete winding type or the "push-pull" type.

These and other objects are attained by the novel construction, combination and arrangement of parts hereinafter described and shown in the accompanying drawing, constituting a material part of this disclosure, and in which:

Fig. 1 is a plan view of the coilable measuring tape with the tape partially extended from the casing, one side of the casing being removed.

Fig. 2 is an elevational view, partly in section, of the measuring device showing details of the casing.

Fig. 3 is a plan view of a modified form of the invention, one side of the casing being removed.

Fig. 4 is a plan view, partly in section, of another modified form of the invention.

Fig. 5 is a plan view showing still another modified form of the invention, one side of the casing being removed.

Fig. 6 is a plan view of a tape employing a winding spring and carrying on the outside of the casing a slider for holding the tape in desired positions and for serving as a marker.

Fig. 7 is a front elevational view of the slider.

Referring to the drawing, in Figure 1 is shown a preferred form of my invention in which a casing 7 has attached thereto at 9, by means of a rivet or other suitable means, a flat arcuate spring 8, which is bent inwardly at 9a so that the spring 8 is normally spaced from the wall of the casing. The casing 7 is made in two parts which are connected by a beading 7a (Fig. 2), and the casing can be made of metal or other suitable materials.

The casing is provided with a center post 10, which is encircled by a loop 12 of a tape 11 of the concavo-convex type or other non-planar form made from ribbon steel, or other suitable metals. In forming the loop 12, the inner end of the tape 11 is curled on itself and secured at 13 by means of a rivet, spot-welding or other means. The tape 11 passes through an opening 6 in the wall of the casing and is provided with a tab 5 at its free end to facilitate manipulation thereof.

In operation, the loop 12 serves as a drum upon which the remainder of the tape is wound; and the arcuate spring 8 is of such strength as to force subsequent convolutions 4 of the tape inwardly towards the drum to decrease the diameter of the coils and to prevent contact with the walls of the casing. The winding of the tape is effected by pushing the tape by hand into the casing; and the spring 8 prevents kinking or jamming of the tape. Without the spring 8, pushing of the tape into the casing would cause binding and kinking after one or two coils to such an extent that movement of the tape in either direction could not be effected without the application of great force, and convenient and ready manipulation of the tape would be impossible. While the center post 10 is shown in the drawing, it is not necessary for the effective winding of my measuring tape; and the center post 10 can be omitted if desired.

In Fig. 3 is shown a modified form of the invention, an arcuate flat spring 28 is attached to the casing at a point 29 spaced from the ends of the spring. The spring 28 forms substantially a complete circle with one extremity 19 thereof spaced inwardly from the other extremity to provide space for the passage of the tape 10, which is coiled upon the loop 12, the coils being completely encircled by the spring 28 so that contact of the coils of the tape with the wall of the casing is not possible.

In the form shown in Fig. 4, a short flat spring 17 has attached thereto an arcuate shoe 18, spaced from the wall of the casing. The shoe resiliently bears against the coils of the tape 11 to decrease the diameter of the coils and to diminish the tendency of the tape to engage the wall of the the casing 7.

In Fig. 5, there is attached to the wall of the casing a cup 14, carrying a short compression spring 16, which bears against a cup 15 telescoping the cup 14. The cup 15 resiliently engages the coils of the tape in substantially the same manner and for the same purpose as set forth above in connection with the form shown in Fig. 4.

In Fig. 6, there is shown a winding spring 20 attached to the post 10 and to the tape 11 in a well known and common manner. The spring 20 may be of the strong or weak type. The straight portion 21 of the tape has slidably mounted thereon outside of the casing a slider 22 provided with a tab 23 having an aperture 24 to allow the tab to pass beyond a pin 25 on the underside of the tape, the pin 25, however, preventing the tab from being removed from the tape. The slider 22 can be moved along the tape to any desired position, and when the slider engages the casing 7, winding or shifting movement of the tape is prevented. It will be seen that the slider acts as a brake as well as a marker in making measurement.

From the above descriptions, it will be seen that I have provided an effective coilable measuring tape of simple structure employing no winding spring, thus greatly decreasing the cost of manufacture, at the same time enabling a "push-pull" operation with a very slight and uniform effort, so that the tape can be drawn out to any desired length without undesirable shifting or creeping.

The foregoing disclosure is to be regarded as descriptive and illustrative only, and not as restrictive or limitative of the invention, of which obviously an embodiment may be constructed including modifications without departing from the general scope herein indicated and denoted in the appended claim.

Having thus described my invention, what I claim as new and desire to secure by Letters Patent, is:

In combination, a casing having a tape opening in its peripheral wall, a post in the casing, a resilient tape of normally concavo-convex cross sectional shape having one of its ends coiled upon itself and secured to the tape to provide a loop, said loop being positioned in the casing and the other end of the tape passing through said opening, said loop floating about the post and being free from attachment to the post, and resilient means attached to the inner peripheral wall of the casing and bearing against the tape to restrict the diameter of the coils thereof and to prevent the coils of the tape from engaging the inner peripheral wall of the casing to enable the tape to be manually pulled from the casing or pushed into the casing without the aid of a winding spring.

HERBERT F. RITTER.